W. O. THIEM & G. E. KREMER.
TRAFFIC SIGNAL LAMP.
APPLICATION FILED MAR. 17, 1914.

1,288,747.

Patented Dec. 24, 1918.
4 SHEETS—SHEET 1.

WITNESSES

INVENTORS
WILLIAM O. THIEM
GEORGE E. KREMER
BY
ATTORNEYS

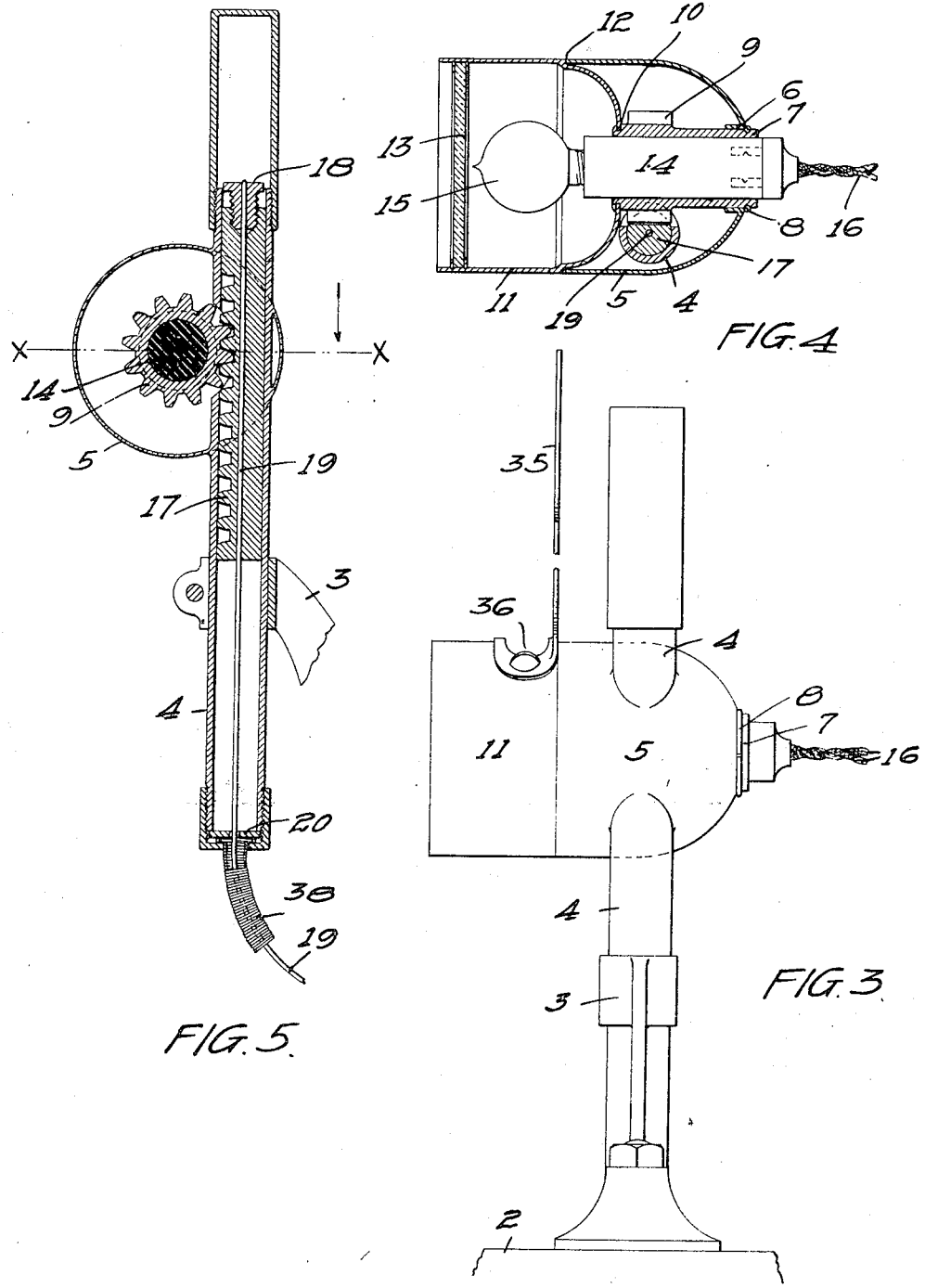

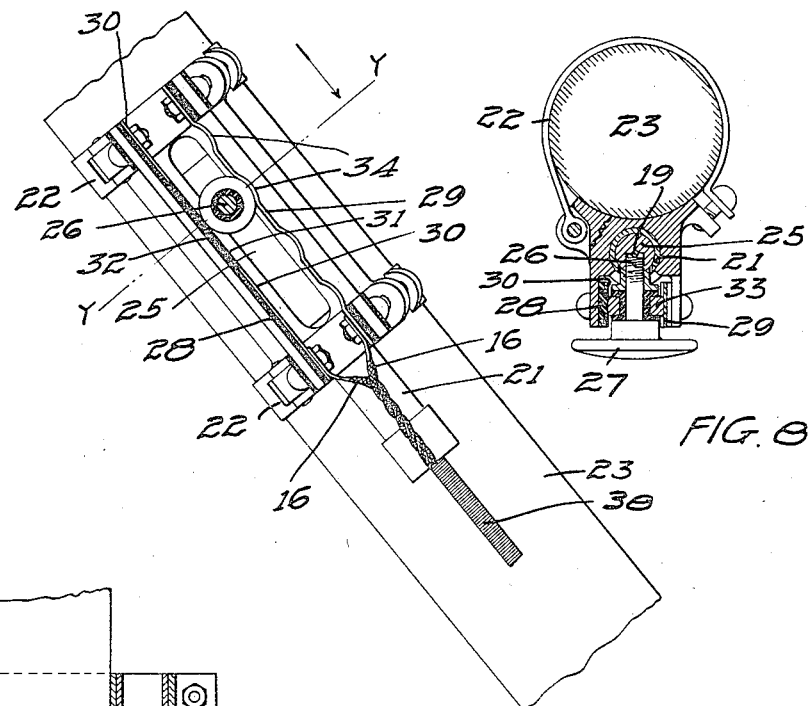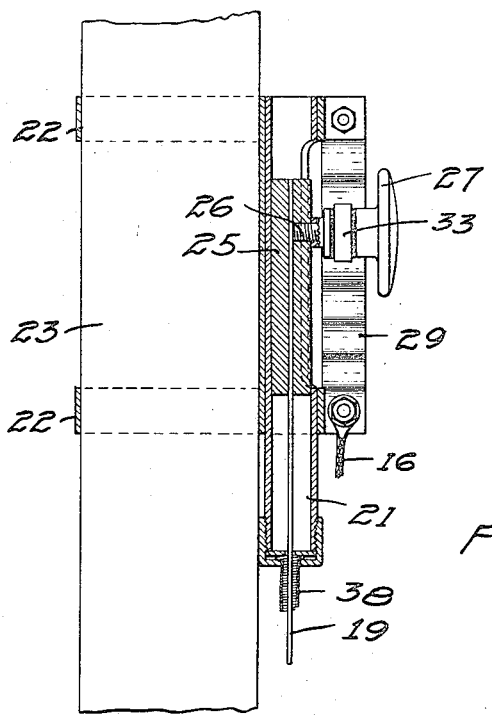

W. O. THIEM & G. E. KREMER.
TRAFFIC SIGNAL LAMP.
APPLICATION FILED MAR. 17, 1914.

1,288,747.

Patented Dec. 24, 1918.
4 SHEETS—SHEET 4.

WITNESSES

INVENTORS
WILLIAM O. THIEM
GEORGE E. KREMER
BY
ATTORNEYS

UNITED STATES PATENT OFFICE.

WILLIAM O. THIEM AND GEORGE E. KREMER, OF MINNEAPOLIS, MINNESOTA.

TRAFFIC SIGNAL-LAMP.

1,288,747. Specification of Letters Patent. Patented Dec. 24, 1918.

Application filed March 17, 1914. Serial No. 825,209.

*To all whom it may concern:*

Be it known that we, WILLIAM O. THIEM and GEORGE E. KREMER, citizens of the United States, residents of Minneapolis, county of Hennepin, State of Minnesota, have invented certain new and useful Improvements in Traffic Signal-Lamps, of which the following is a specification.

The object of our invention is to provide a signaling device in connection with a power propelled vehicle by means of which the driver can indicate to the traffic officer or pedestrians or the drivers of other cars whether he intends to continue straight ahead, turn to the right or left, or stop.

A further object is to provide a device of simple, durable construction, which can be easily and quickly applied to a car.

A further object is to provide a signaling device that is within convenient reach of the driver.

Other objects of the invention will appear from the following detailed description.

The invention consists generally in various constructions and combinations, all as hereinafter described and particularly pointed out in the claims.

In the accompanying drawings forming part of this specification,

Figure 1 is a detail view illustrating the application of our invention to the front and rear of a car, Fig. 2 is a front elevation of the signal lamp, showing the different positions assumed by the indicator, Fig. 3 is a side elevation of the lamp and indicator, Fig. 4 is a sectional view through the lamp casing, taken on line $x$—$x$ of Fig. 5, Fig. 5 is a detail sectional view of the mechanism for operating the indicator hand, Fig. 6 is a detail view, showing the manner of mounting the indicator controlling mechanism on the steering post of the car, Fig. 7 is a detail sectional view through the controlling mechanism, Fig. 8 is a transverse sectional view through the controlling mechanism, taken on line $y$—$y$ of Fig. 6.

Figure 1:
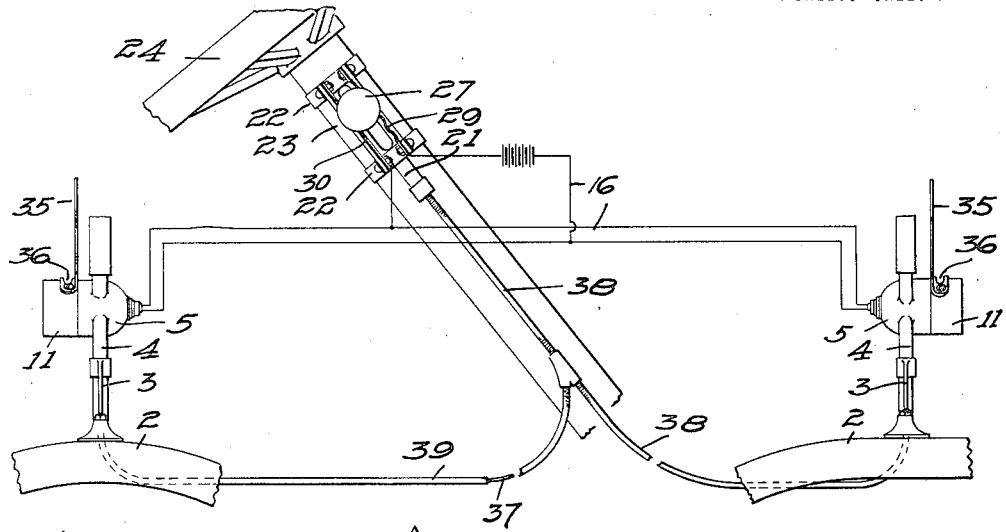
Figure 2:
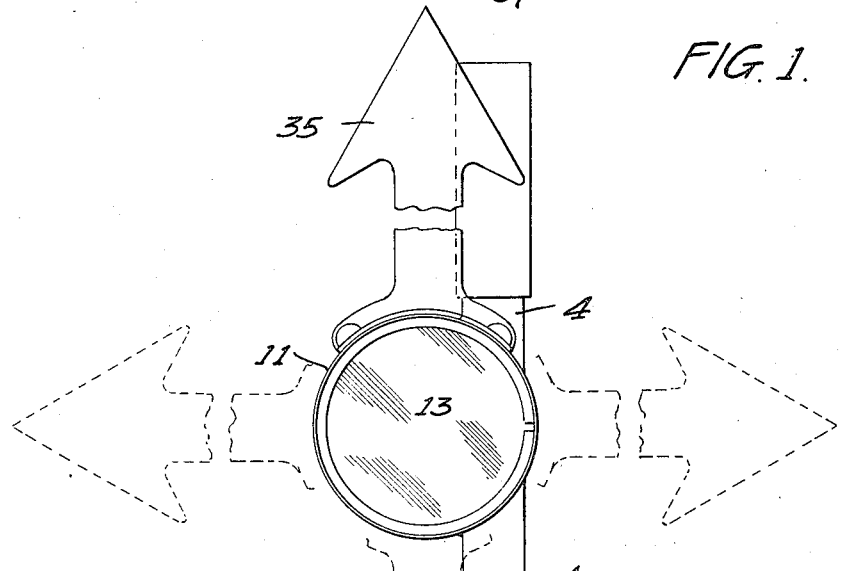

In the drawing, 2 represents a portion of the mud guard of the car, on which is mounted a bracket 3 supporting an upright tube 4. This tube passes through a casing 5, cup-shaped in form and having an opening 6 therein to receive a hub 7 that is held in place in said opening by a spilt locking ring 8 fitting within an annular groove in the hub and bearing against the wall of the casing. This hub is provided with a pinion 9 and a short hub 10. A shell 11 also cup-shaped in form, has an opening to receive the end of the hub 10 and by means of said hub the shell 11 is riveted to the hub 7 and is capable of rotating therewith. Said shell also has a shoulder 12 forming a seat for the edge of the casing 5. A suitable lens 13 is mounted in the open outer end of the shell 11. An insulating plug 14 fits within the hub 7 and is provided with a suitable lamp 15 and with conductors 16 leading to a suitable source of electrical energy on the car.

Within the tube 4 is a rack bar 17 in the form of a plunger having teeth to engage the teeth of the pinion 9 and provided at one end with a split plug 18 in which an operating wire 19 is anchored. This wire extends preferably through the rack bar from end to end and through an opening in the disk 20 in the tube 4, and extends into a tube 21 secured by clamps 22 to a steering post 23, preferably near the steering wheel 24. This end of the wire is anchored in a slide 25, preferably by means of a clamping screw 26 having a finger grip 27. This finger grip is adapted to slide between an insulated plate 28 and a contact spring 29 carried by the clamps 22 and insulated therefrom, as indicated in Fig. 6. A contact plate 30 is mounted on the insulated plate 28 and is slotted at 31 to expose the insulated surface 32 of the plate 28 and break the circuit at this point. The circuit is closed by means of the circuit closing ring 33 that is mounted on a clamp screw 26 and insulated therefrom and is adapted to slide between the plate 30 and the contact spring 29. This contact spring is preferably provided with bends or offsets 34 therein in which the contact ring is seated, and held in its different adjustments in the operation of the clamp screw to change the position of the indicating hand. A contact plate 30 is connected with one of the conductors 16, while the contact spring 29 is connected with the other conductor 16 of the same circuit, these conductors running through a suitable source of electrical energy to the lamp, as indicated in Fig. 1.

The indicator hand in the form of a spear head or any other suitable shape desired, is indicated at 35 as mounted on the shell 11 to revolve therewith, and the shell is provided with an opening 36 therein so that the rays of light will be thrown upon the polished surface of the indicator hand and render it plainly visible to the traffic officer or pedestrian, or the driver of another car.

We prefer to provide the indicator signal in duplicate, arranging one at the front of the car or vehicle and another at the rear thereof, as shown in Fig. 1, both on the same circuit, the rear indicator having a wire 37 joined to the wire 19 in a suitable manner so that the indicator hands will be operated simultaneously. These wires are inclosed by coiled springs 38 and 39 put under tension by the movement of the wires in one direction and operating to brace and stiffen the wires when the operating device is pushed from an upper to a lower position on the steering post.

In Fig. 6 we have shown four possible adjustments of the controlling device. As shown, the controlling device is set for ahead movement, the indicator hand being in an upright or vertical position at the top of the lamp, and during this movement the light is out, the circuit being broken as shown in Figs. 6 and 8. If the driver moves the controlling device to the top of the guide, the indicator hand will be moved to the left to a horizontal position and the circuit will be closed from the contact plate 30 through the contact ring 33 to the spring 29 and from thence through the conductors to the lamp. The light, colored if preferred, will flash, throwing the rays in front and toward the rear and upon the indicator hand and anyone in the street or approaching from an opposite direction or moving in the same direction will be warned that the driver of the car intends to turn to the left. If to the right, he will move the controlling device downward and the circuit will be closed from the plate 30, ring 33, the spring 29, and the indicator hand will be moved toward the right, warning pedestrians and drivers that the car is about to turn in that direction. If the controlling device is moved to the bottom of the guide, the indicator hand will point downward, with the circuit closed through the lamp and the drivers of the cars approaching from the rear will be warned that the car or vehicle ahead is about to stop.

Figure 10:
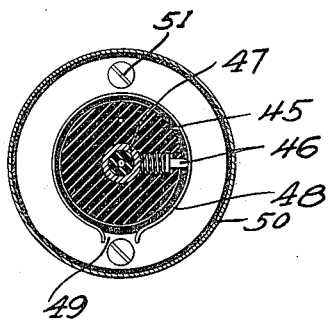
Fig. 10 is a transverse sectional view, taken on line $z$—$z$ of Fig. 9, showing the means for making or breaking the circuit through the lamp connections.
Figure 9:
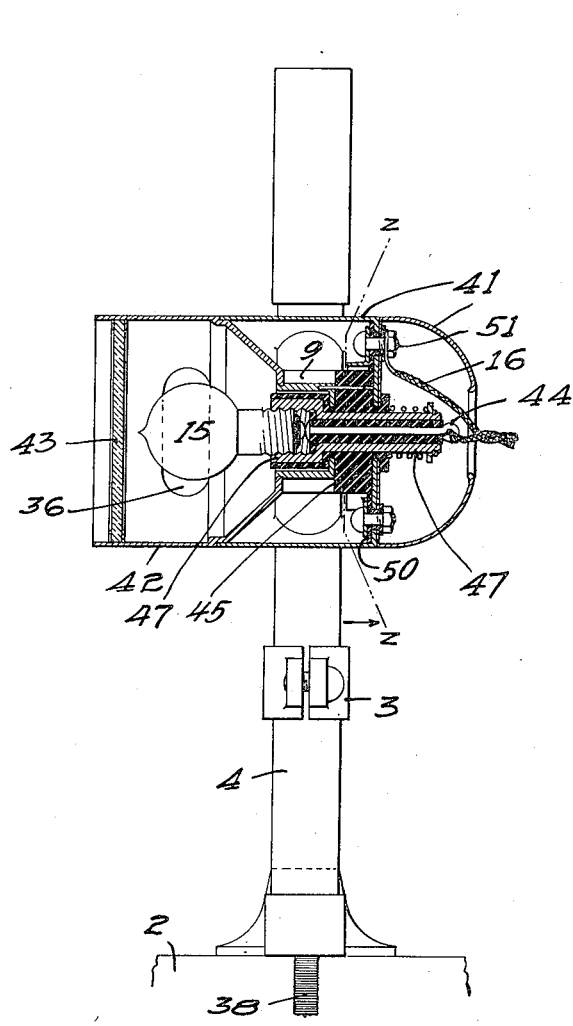
Fig. 9 is a detail sectional view illustrating a modified construction.
Figure 11:
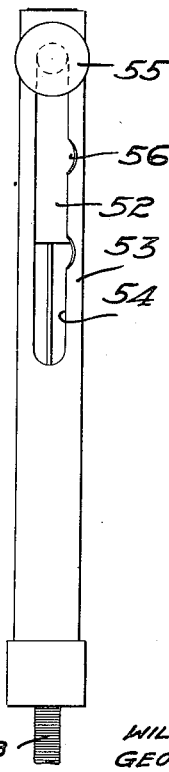
Fig. 11 is a detail view of the device for controlling the lamp indicator from the driver's seat.

In Figs. 9, 10 and 11 we have illustrated a modified construction, in which the circuit is closed at the lamp instead of at the controlling device mounted on the steering post. In this device a casing 41 is mounted on the tube of the rack bar in a manner substantially as shown in Fig. 5, and a shell 42 having a lens 43 is mounted on the hub of the pinion corresponding to the one shown in Fig. 4 and engaging the teeth of the rack bar. The lamp is mounted in a socket in the hub 47 to contact with an insulated pin 44 to which one of the conductors is attached. An insulating disk 45 is secured to the pinion and is provided with a spring pressed contact pin 46 in circuit at one end with a sleeve 47 and arranged to bear on a flange 48 having a gap or opening 49 therein which breaks the circuit between the pin 46 and the flange at a predetermined point in the revolution of the insulating disk. This flange is carried by a disk 50 that is insulated from the sleeve 47 and has a terminal 51 for the other conductor 16 of the circuit. As long as the pin 46 is in contact with the flange 48 the circuit will be closed through a pin 44, the lamp, the sleeve 47, the pin 46, and the flange 48 to the other conductor terminal. The wire from the rack bar flange of this lamp is connected to a slide 52 arranged in a tube 53 on the steering post, said tube having a slot 54 therein to receive the shank of a thumb screw 55. Recesses 56 are provided in one edge of the slot to receive the thumb screw and indicate its different adjustments in the slot for the different positions of the indicator hand.

In various ways the details of construction herein shown and described may be modified and still be within the scope of our invention.

We claim as our invention:

1. A traffic signaling device comprising a lamp, an indicator hand, an electric circuit, a tube having means for mounting it on the steering post of a car, a slide arranged in said tube, means operatively connecting said slide with said indicator hand, a thumb screw carried by said slide, and means for making or breaking the circuit through said lamp when said slide and thumb screw are moved in said tube.

2. A traffic signal device comprising a lamp, an indicator hand and electric circuit, a guide having means for mounting it on the steering post of a car, a slide movable in said guide, means operatively connecting said slide with said indicator hand, and a contact engaged by said slide for making and breaking the circuit through said lamp.

3. A traffic signaling device comprising a lamp, an indicator hand and electric circuit, a guide having means for clamping it on the steering post of a car, a slide mounted to move in said guide, means operatively connecting said slide with said indicator hand, and a contact plate engaged by said slide for making and breaking the circuit through said lamp.

4. The combination, with a steering post, of a slide mounted thereon, an indicator hand operatively connected with said slide to be actuated thereby, a lamp having an electric circuit, a finger grip mounted on said slide, and circuit closing plates connected with said lamp and having means for contacting with said slide for making and breaking the circuit through said lamp.

In witness whereof, we have hereunto set our hands this 14th day of January, 1914.

WILLIAM O. THIEM.
GEORGE E. KREMER.

Witnesses:
GENEVIEVE E. SORENSEN,
EDWARD A. PAUL.